(12) United States Patent
Jung et al.

(10) Patent No.: US 9,351,131 B2
(45) Date of Patent: May 24, 2016

(54) METHOD AND APPARATUS FOR GENERATING COMMUNICATION GROUP BY DYNAMICALLY DETERMINING A GROUP OWNER

(71) Applicant: Samsung Electronics Co., Ltd., Gyeonggi-do (KR)

(72) Inventors: Buseop Jung, Gyeonggi-do (KR); Chanki Jo, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/187,791

(22) Filed: Feb. 24, 2014

(65) Prior Publication Data

US 2014/0243035 A1    Aug. 28, 2014

(30) Foreign Application Priority Data

Feb. 22, 2013 (KR) .................... 10-2013-0019277

(51) Int. Cl.
| | |
|---|---|
| *H04B 7/00* | (2006.01) |
| *H04W 4/08* | (2009.01) |
| *H04W 8/18* | (2009.01) |
| *H04W 76/00* | (2009.01) |
| *H04W 84/18* | (2009.01) |

(52) U.S. Cl.
CPC ............. *H04W 4/08* (2013.01); *H04W 8/186* (2013.01); *H04W 76/005* (2013.01); *H04W 84/18* (2013.01)

(58) Field of Classification Search
CPC ...... H04W 4/08; H04W 76/023; H04W 8/005; H04W 76/005; H04W 4/02; H04W 84/20; H04W 48/16; H04W 4/001; H04W 76/043; H04W 84/12; H04L 65/403; H04L 51/38; H04L 67/10; H04L 12/1818; H04L 12/185; H04L 67/104; H04L 63/104; H04L 29/12047; H04L 41/12
See application file for complete search history.

(56) References Cited

U.S. PATENT DOCUMENTS

| | | | |
|---|---|---|---|
| 2012/0278389 A1* | 11/2012 | Thangadorai | 709/204 |
| 2013/0013697 A1* | 1/2013 | Tsuchida | 709/204 |
| 2013/0252656 A1* | 9/2013 | Lee et al. | 455/519 |

* cited by examiner

*Primary Examiner* — Golam Sorowar
(74) *Attorney, Agent, or Firm* — The Farrell Law Firm, P.C.

(57) ABSTRACT

Methods and apparatus are provided for generating a communication group. An input for initiating generation of the communication group is received while the terminal operates in a communication group generation mode. One or more communication group participant terminals are sought in response to the input. When at least one communication group participant terminal is found, it is determined whether an owner terminal of the communication group exists among the at least one communication group participant terminal based on predetermined priority determination criteria. When the owner terminal of the communication group exists, an invitation message is received from the owner terminal. The owner terminal is connected to upon reception of the invitation message.

19 Claims, 7 Drawing Sheets

METHOD AND APPARATUS FOR GENERATING COMMUNICATION GROUP BY DYNAMICALLY DETERMINING A GROUP OWNER

PRIORITY

This application claims priority under 35 U.S.C. §119(a) to a Korean patent application filed on Feb. 22, 2013 in the Korean Intellectual Property Office and assigned Serial No. 10-2013-0019277, the entire disclosure of which is incorporated herein by reference.

BACKGROUND

1. Field of the Invention

The present invention relates generally to communication between terminals and, more particularly, to a method for generating a communication group having a plurality of terminals and apparatus implementing the same.

2. Description of the Related Art

Communication terminals are able to directly communicate through a radio channel. For example, Wireless-Fidelity (Wi-Fi) Direct (or Wi-Fi Peer-to-Peer (P2P)) allows devices to connect with each other without an Access Point (AP). Wi-Fi Direct is compatible with previous Wi-Fi technologies, supports Wi-Fi Protected Access II (WPA2) to improve security, and makes it possible to establish a connection with a simplified setup through Wi-Fi Simple Configuration (WSC). Also, since Wi-Fi Direct supports one-to-many connections, it is possible to generate a Wi-Fi Direct group that includes a plurality of terminals.

However, procedure for establishing the one-to-many connections in conventional Wi-Fi Direct technology has drawbacks.

First, when a terminal attempts to join a peer-to-peer connection to generate a communication group, the terminal must wait until the peer-to-peer connection is released, and such an attempt may fail before the connection release.

Second, when a terminal generates a group by itself and invites other terminals to join the group, one of the terminals must be a Group Owner (GO) and an extra procedure is required to determine the GO among the terminals attempting to join the group.

Thus, the conventional communication group generation method has drawbacks of latency and inconvenience, resulting in degradation of usability of group communication.

SUMMARY OF THE INVENTION

The present invention has been made to address at least the above problems and/or disadvantages and to provide at least the advantages described below. Accordingly, an aspect of the present invention provides a method for generating a communication group that is capable of dynamically determining the GO and reducing the steps for generation of communication group.

In accordance with an aspect of the present invention, a method for generating a communication group in a terminal is provided. An input for initiating generation of the communication group is received while the terminal operates in a communication group generation mode. One or more communication group participant terminals are sought in response to the input. When at least one communication group participant terminal is found, it is determined whether an owner terminal of the communication group exists among the at least one communication group participant terminal based on predetermined priority determination criteria. When the owner terminal of the communication group exists, an invitation message is received from the owner terminal. The owner terminal is connected to upon reception of the invitation message.

In accordance with another aspect of the present invention, a terminal is provided that supports a communication group generation mode. The terminal includes a display unit that includes a touch panel, and a radio communication unit that is responsible for communication with one or more communication group participant terminals. The terminal also includes a control unit that controls the display unit to display an interface for generating a communication group, receives an input for initiating generation of the communication group through the display unit, controls the radio communication unit to search for the one or more communication group participant terminals in response to the input, determines, when at least one communication group participant terminal is found, whether an owner terminal of the communication group exists among the at least one communication group participant terminal based on predetermined priority determination criteria, receives, when the owner terminal of the communication group exists, an invitation message from the owner terminal, and controls connecting to the owner terminal upon reception of the invitation message.

BRIEF DESCRIPTION OF THE DRAWINGS

The above and other aspects, features, and advantages of the present invention will be more apparent form the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in this description are not to be interpreted by their common or dictionary meaning but based on the principle that an inventor can adequately define the meanings of terms to best describe the present invention, to be interpreted by the meaning and concept conforming to the technical concept of the present invention.

In the drawings, certain elements may be exaggerated, omitted, or schematically depicted for clarity of the disclosure. The actual sizes of the elements are not reflected. Thus, embodiments of the present disclosure are not limited in the relative sizes of the elements and distances therebetween.

Figure 1:
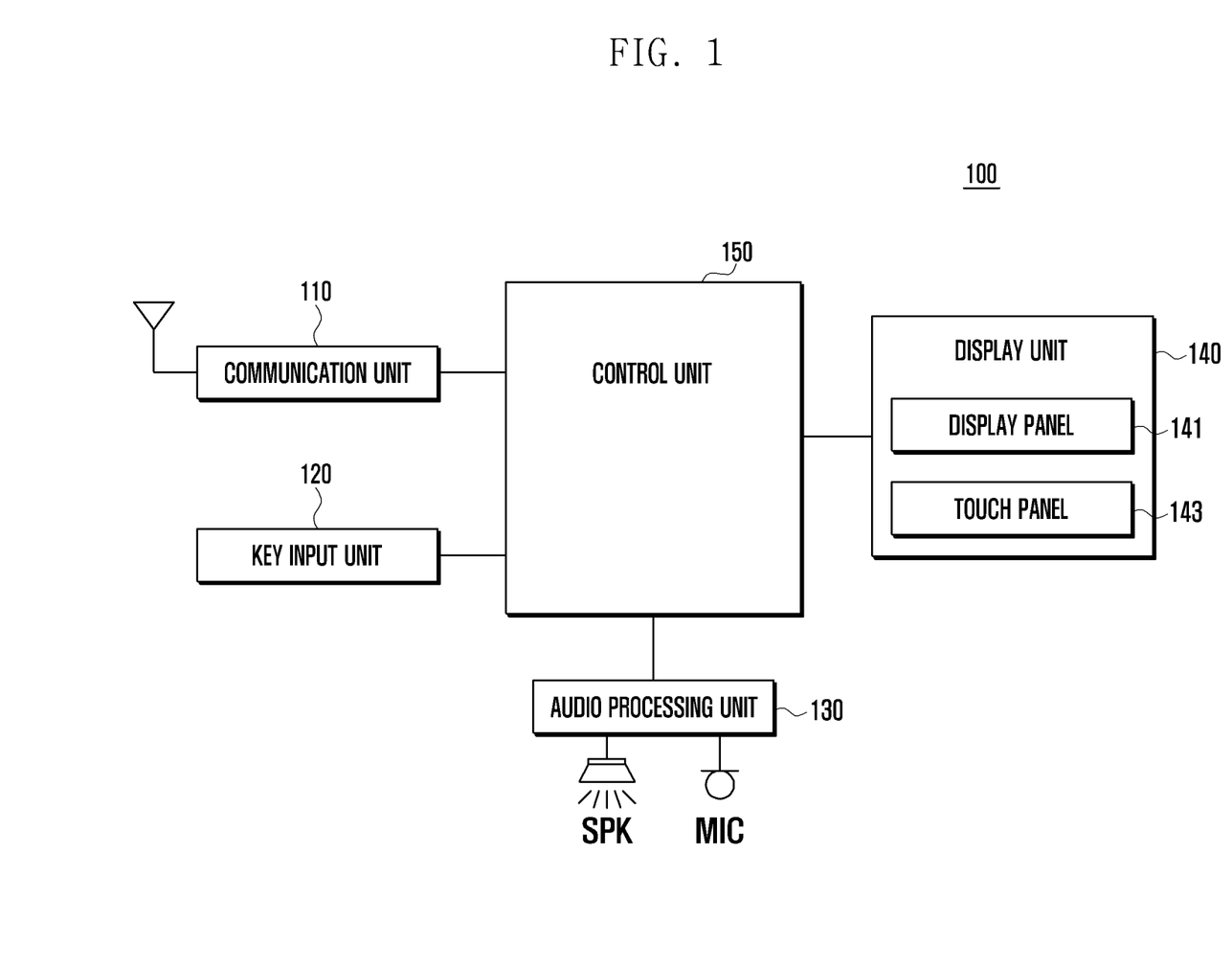
FIG. 1 is a block diagram illustrating a configuration of a terminal, according to an embodiment of the present invention.

FIG. 1 is a block diagram illustrating a configuration of a terminal, according to an embodiment of the present invention. Referring to FIG. 1, a terminal 100 includes a communication unit 110, a key input unit 120, an audio processing unit 130, a display unit 140, and a control unit 150.

In an embodiment of the present invention, the terminal may operate in a communication group generation mode in which the terminal 100 activates the settings and functions for performing the process of generating a communication group with other terminals. In order to accomplish operation in this mode, the control unit 150 of the terminal 100 may provide the user with a common User Interface (UI) to activate/deactivate the communication group generation mode and perform the process of generating the communication group.

The terminal 100 is the host for performing the communication group generation process, according to an embodiment of the present invention. Specifically, the terminal 100 is the end user terminal in which the present invention is embodied. In the communication group generation mode, the terminal 100 may or may not be the owner terminal of the communication group. The communication group generation process may progress differently according to whether the terminal 100 is the owner terminal or non-owner terminal of the communication group.

In the following description, the term 'communication group participant terminal' denotes a terminal taking part in the communication group that the terminal 100 in the communication group generation mode generates.

The communication GO terminal is determined from among the host terminal 100 and other communication group participant terminals, according to priority determination criteria, which is described in greater detail below. The terminal 100 may become the GO terminal based on the priority determination criteria. Once one of the communication group participant terminals is determined to be the GO terminal, the terminal 100 checks the GO terminal.

The communication unit 110 is responsible for a communication function of the terminal 100. The communication unit 110 may support various communication functions of the terminal 100. Particularly, in an embodiment of the present invention, the communication unit 110 may support peer-to-peer and one-to-many direct communications between the host terminal and the communication group participant terminals.

The communication unit 110 may be activated in response to a user's request, along with display of any one of various types of key maps and control keys on the screen of the display unit 140, for controlling the communication unit 110. The communication unit 110 may include a cellular communication module for supporting a cellular communication function of the terminal 100. The communication unit 110 establishes a communication channel with a cellular communication system to exchange signals for cellular communication. For example, the communication unit 110 may establish at least one channel with the cellular communication system for voice telephony service, video service, and data service, and may support service-specific signal communications.

Particularly, in an embodiment of the present invention, the communication unit 110 searches for the communication group participant terminals and exchanges various messages and signals with the participant candidate terminals to generate the communication group.

The key input unit 120 is responsible for generating input signals necessary for operation of the terminal. The key input unit 120 may include at least one of a keyboard, a keypad, key buttons, etc.

When a touchscreen is embodied in the display unit 140, the key input unit 120 may include the physical keys that are not provided by a touch map presented on the touchscreen. The key input unit 120 may include a key designated for activation/deactivation of the communication group generation mode.

The audio processing unit 130 may output audio data generated by playing an audio file associated with the operation of the terminal 100 and received from outside. The audio processing unit 130 may be responsible for an audio data collection function. For this purpose, the audio processing unit 130 includes a speaker (SPK) and a microphone (MIC). Particularly, in an embodiment of the present invention, when the terminal 100 detects activation/deactivation of the communication group generation mode, group generation completion, and entry of a new terminal into a communication group, the audio processing unit 130 may output designated sound effects or a notification sound.

When there is any change in the communication group, the control unit 150 updates the communication group terminal list and presents the list in the form of a popup window along with a sound effect or notification sound generated by the audio processing unit 130.

The output of a sound effect and notification sound may be omitted according to the user's configuration or terminal designer's intention.

The display unit 140 provides various screen interfaces necessary for operations of the terminal 100. For example, the display unit 140 may display a standby screen, a menu screen, and a text input window for a text input mode. The display unit 140 includes a touch panel 143 and a display panel 141. The touch panel 143 may have a size greater than or equal to that of the display panel 141 to support a full-touch function.

Particularly, in an embodiment of the present invention, the display unit 140 may be implemented in the form of a touchscreen. The touch input window may be provided in various soft keyboard formats, according to a typical touch map principle. For example, the touch input window may be provided in one of the soft key formats of 3*4 key map, 5*4 key map, qwerty key map, Dvorak key map, etc. The display unit 140 displays the user interface of the communication group generation mode.

If the terminal 100 detects activation/deactivation of the communication group generation mode, communication group generation completion, or entry of a new terminal into the group, the display unit 140 may display a notification message on the corresponding situation. The display unit 140 may display a list of the participant terminals with brief information thereon. When there is any change in the communication group, the updated list is displayed in the form of a popup window.

The control unit 150 controls signal transfers associated with communication group generation, power supply and distribution, storing of application programs, configurations, and data associated with the communication group generation. The control unit 150 controls the communication group generation mode to generate a communication group. The control unit 150 controls storage of the configuration on the user interface of the communication group generation mode, and provides the user interface.

The control unit 150 controls the display unit 140 to display the user interface for operating the communication group generation mode on the display panel 141. The control unit 150 may display the menu options or input window in order for the user to activate/deactivate the communication group generation mode through the communication group generation mode user interface.

The control unit 150 receives a communication group generation activation/deactivation signal through one of the touch panel 143 of the display unit 140 and the key input unit 120. In the communication group generation mode, the control unit 150 receives a user input for starting communication group generation through one of the display unit 140 and key input unit 120.

The control unit 150 controls the communication unit 110 to search for the communication group participant terminals to generate a communication group.

The control unit 150 may process the messages to be exchanged with the communication group participant terminals to generate a communication group. The message may be a typical instant message and may include a connection request to the communication group owner terminal or a connection accept to the communication group participant terminals.

The control unit 150 may control the terminal 100 to connect the owner terminal by means of the communication unit 110. In an embodiment of the present invention, the communication group owner terminal generates an invitation message to be sent to the communication group participant terminals for generating the communication group.

If the invitation message is received from the terminal 100, the communication group participant terminal connects to the owner terminal 100 to generate a communication group. For backward compatibility with previous systems, the communication group participant terminal may transmit a connection accept request signal to the terminal 100 to generate the communication group. The terminal 100 may also transmit a connection accept signal to establish the connection. The control unit 150 may detect the connection of the communication group participant terminal to the terminal 100, as the communication group owner terminal, after transmitting the invitation message to the communication group participant terminal by means of the communication unit 110.

In an embodiment of the present invention, after the communication group participant terminal search procedure, it is possible to generate the communication group simply and quickly without extra permission or an authentication procedure because the participant terminals are identified based on the unique terminal information. The communication group owner terminal is determined according to predetermined criteria, and manages the connection procedure. There is no need for a complex request and accept signal exchange.

When the terminal 100 is not the communication group owner terminal, it is typical for the terminal 100 to receive the invitation message from the communication group owner terminal, in an embodiment of the present invention. However, if no invitation message is received, e.g., if the owner does not regard the terminal 100 as an invitation message target, the control unit 100 may generate an invitation request message to the communication group owner terminal.

If the invitation message is received from the communication group owner terminal, the terminal 100 automatically connects to the owner terminal to generate a communication group. However, the terminal 100 may separately transmit a connection permission request signal to the owner terminal for compatibility with the legacy system, or according to the system designer's intention. The owner terminal may also transmit a connection permission signal to establish the connection. When the control unit 150 generates the invitation request message, the terminal 10 transmits the invitation request message to owner terminal. The owner terminal regards the terminal 100 as an invitation message transmission target and transmits the invitation message to the terminal 100.

In an embodiment of the present invention, the communication group participant terminals are identified based on unique information of the terminals in the communication group participant terminal search procedure. Thus, it is possible to simply and quickly generate the communication group without extra permission requests or authentication procedures. Since the communication group owner terminal is determined according to predetermined criteria and manages the connection process, there is no need for a complex exchange of request and permission signals.

The control unit 150 may control the communication unit 110 to transmit/receive the messages.

The control unit 150 may control the display unit 140 to display the message transmitted/received by the terminal 100 in the communication group generation procedure. The control unit 150 may include a message processing module for generating the messages. The control unit 150 may processes the invitation message received through the communication unit 110 so as to display the message on the screen of the display unit 140. The control unit 150 may also generate the invitation request message to be transmitted through the communication unit 110 by means of the message processing module.

When the terminal 100 is the communication group owner terminal, the control unit 150 may receive information on the communication group participant terminals through the communication unit 110 to generate a list of the communication group participant terminals. When there is any change in the group of communication group participant terminals, the list of the communication group participant terminals is updated. The list may be managed by the message management module or a dedicated list generation module. The control unit 150 also may store the information on the communication group participant terminals and the communication group participant terminal list.

The terminal information may include a device time, unique information such as, for example, a Media Access Control (MAC) address, an Operating System (OS) type and version, communication group generation mode compatibility information (identity information), an Internet Protocol (IP) address, a base station, a communication environment such as, for example, a terminal location, a web browser type and version, a terminal's communication server and subscription information, a communication group participation order, an un-subscription status, a communication group task, the presence/absence of data communication with other terminals, a sharing-allowed file stored in the terminal, etc.

Table 1 shows a client information descriptor (Client Info Descriptor) describing information on the terminal. The terminal information is not limited that provided Table 1.

TABLE 1

Client Info Descriptor

| Field Name | Size (octets) | Value | Description |
| --- | --- | --- | --- |
| Length | 1 | variable | Length of the following fields. |
| P2P Device address | 6 | — | An identifier used to uniquely reference a P2P Device. |
| P2P Interface address | 6 | — | An address used to identify a P2P Device within a P2P Group. |
| Device Capability Bitmap | 1 | variable | A set of parameters indicating P2P Device's capabilities, as defined in Table 12. |
| Config Methods | 2 | As defined in [6] | The WSC Methods that are supported by this device e.g. PIN from a Keypad, PBC etc. Contains only the Data part of the WSC Config Methods attribute (see [6]). Note—Byte ordering within the Config Methods field shall be big-endian. |
| Primary Device Type | 8 | As defined in Annex B | Primary Device Type of the P2P Client (see Annex B). Contains only the Data part of the WSC Primary Device Type attribute (excludes the Attribute ID and Length fields). Note—Byte ordering within the Primary Device Type field shall be big-endian. |
| Number of Secondary Device Types | 1 | variable | Indicating number of Secondary Device Types in the Secondary Device Type Listfield. This field set to 0 indicates no Secondary Device Type List. |
| Secondary Device Type List | variable | 8n | List of Secondary Device Types of the P2P Client (see [6]). This field is optional. This field is present only if the Number of Secondary Device Types field is not 0 and contains only the Data part of the WSC Secondary Device Type List attribute (excludes the Attribute ID and Length fields). Note—Byte ordering within the Secondary Device Type Listfield shall be big-endian. |
| Device Name | variable | As defined in [6] | Friendly name of the P2P Client. Contains the entire WSC Device Name attribute in TLV formay (see [6]). Note—Byte ordering within the Device Name field shall be big-endian. |

The list may be generated in the form of any of a table, a diagram, a graphic with text and may include all or a part of the terminal information. The list may be formed based on the amount of information in the list and information items provided by the list, according to the user's configuration and manufacturer's intention.

The terminal 100 may exchange the terminal information and the list (including update) with the communication group participant terminals by means of the communication unit 110.

When the terminal 100 is the communication group owner terminal, the terminal 100 receives the communication group participant terminal information from the communication group participant terminal, and stores the received information. The control unit 150 may generate the list based on the terminal information and send the list to the communication group participant terminals. The terminal 100 periodically receives and stores information on the communication group participant terminals. If the currently received information differs from the previously received information, the control unit 150 may update the list based on the difference, and send the updated list to the communication group participant terminals.

When the terminal 100 is the communication group participant terminal, the control unit 150 controls the communication unit 110 to transmit information on the terminal 100 to the communication group owner terminal. The control unit 150 may control the terminal 100 to receive the list including the information on the communication group participant terminals including the terminal 100 and the communication group owner terminal, by means of the communication unit 110.

When there is any change in the information on the communication group participant terminals, the control unit 150 may receive the updated list of the communication group participant terminals from the communication group owner terminal and update the information on the communication group participant terminals based thereon. The control unit 150 may store the list and information on the communication group participant terminals.

The control unit 150 may display the list or the updated list on the screen of the display unit 140 and, if necessary, may control the audio processing unit 130 to output audio for notifying of transmission/reception of the information and the list and of display of the list.

The control unit 150 may determine the communication group owner terminal among the terminal 100 and the communication group participant terminals, and may store priority determination criteria for determining an invitation message transmission order of the owner terminal. The priority determination may be performed based on unique information of the terminal 100 and communication group participant terminals.

A detailed description of the priority determination method is provided below. The terminal 100 performs a communication group participant terminal search process and the communication group participant terminal reply, for generating the communication group in the communication group generation mode.

The terminal 100 determines whether the responded terminals support the communication group generation mode and whether they are candidate communication group participant terminals. In the terminal search and response process, it is possible to check the unique information of the terminals. The unique information of the terminal may be a part of the information transmitted from the terminal 100 as non-owner terminal to the owner terminal, or the information transmitted from the communication group participant terminals to the terminal 100 as the owner terminal. The unique information is capable of being checked before completion of any connection or communication group generation.

The control unit 150 determines whether the terminal 100 is the owner terminal according to the criteria configured based on the unique information. For example, the terminal having a large value of a MAC address may be allocated high priority. The unique information may be the identifier (e.g., a Service Set Identifier (SSID)) input for generating the communication group or a certain value input into the identifier (ID) indicating that the terminal supports the communication group generation mode. Specifically, the priority determination criteria may be based on values indicating simple characters and numbers, rather than indicating performance superiority/inferiority.

When the terminal 100 is not the owner terminal, the control unit 150 determines whether there is an owner terminal among the communication group participant terminals, based on the predetermined criteria.

The terminal 100 may simultaneously perform the processes of determining whether it is the owner and whether there is an owner terminal among the communication group participant terminals, based on the priority criteria based on the unique information shared among the terminals supporting the communication group generation mode.

The control unit 150 may determine whether the terminal 100 is the group owner terminal according to the criteria, and check the group owner terminal among the communication group participant terminals found for establishing the communication group, aside from the terminal 100. When the terminal 100 is the group owner terminal, the control unit 150 may determine the priorities of the communication group participant terminals for transmitting the invitation message thereto. When the terminal 100 is not the group owner terminal, the terminal 100 is invited by the group owner in the order of the priority.

However, if no terminal participating in the communication group generation is found, the control unit may determine the communication group owner terminal regardless of the priority determination criteria. For example, this may occur when the terminal 100 has received the communication group generation initiation input first, and the communication group participant terminals have not yet received the invitation input. This also may occur when the terminal 100 has not found any communication group participant terminal. When the terminal becomes the group owner terminal in itself, the control unit 150 controls the communication unit 110 to search for the communication group participant terminals.

When one of the communication group participant terminals has been determined to be the owner terminal with priority, the control unit 150 of the terminal 100 detects the predetermined owner terminal. The terminal 100 may detect the communication group owner terminal through a search process, and may transmit unique information on the terminal 100 to the communication group owner terminal. The terminal 100 may receive the information on the communication group participant terminal from the owner terminal.

When the terminal 100 is determined to be the communication group owner terminal, regardless of the priority determination criteria, the unique information of the communication group participant terminal is received from the respective communication group owner terminal in response in the search process. If the terminal 100 is not the owner terminal, the unique information of each communication group participant terminal is received in response to the search process of the terminal 100 through the communication group owner terminal. However, the terminal 100 may be configured to receive the unique information of the communication group participant terminals directly from each communication group participant terminal, according to the designer's intention.

When the terminal 100 searches for the communication group participant terminals to establish a communication group, the control unit 150 may control the search process to be performed for a predetermined duration to reduce power consumption of the terminal 100.

An embodiment of the present invention is described in association with a situation in which the control unit 150 searches for communication group participant terminals in a specific time of a predetermined search period, e.g., the specific time between 90 and 100 seconds of the predetermined search period of 100 seconds.

The control unit 150 begins searching for communication group participant terminals when 90 seconds has elapsed in the 100-second search time by means of the communication unit 110, and it is determined that the terminal 100 is the communication group owner terminal. This may be the case when the communication group owner terminal is not the terminal 100, when generation of the communication group with the communication group participant terminals, excluding the owner terminal, is complete. Accordingly, the communication group generation mode of the communication group owner terminal may be deactivated. The communication group owner terminal may determine that the communication group generation has completed, and thus deactivated the communication group generation mode. It may be assumed that the terminal 100 attempts to join the communication group too late.

In order for the UE 110 to connect to the communication group owner terminal, the control unit 150 checks whether the communication group generation mode of the communication group owner terminal is activated. If the communication group generation mode of the owner terminal is deactivated, the terminal 100 sends the communication group owner terminal an invitation request message to receive an invitation message from the owner terminal. If the invitation request message is received, the communication group owner terminal sends the communication group invitation message to the terminal 100.

If the communication group invitation request message is received in the state that the terminal is determined as the communication group owner terminal, and thus, the communication group generation is being completed, the terminal 100 may transmit the communication group invitation message to other terminals.

The time predetermined as the search time, or specific duration, may be changed according to the user's configuration or manufacturer's configuration.

The communication group generation method, according to an embodiment of the present invention, is described in detail below with reference to FIGS. 2 to 5, and 7.

Figure 2:
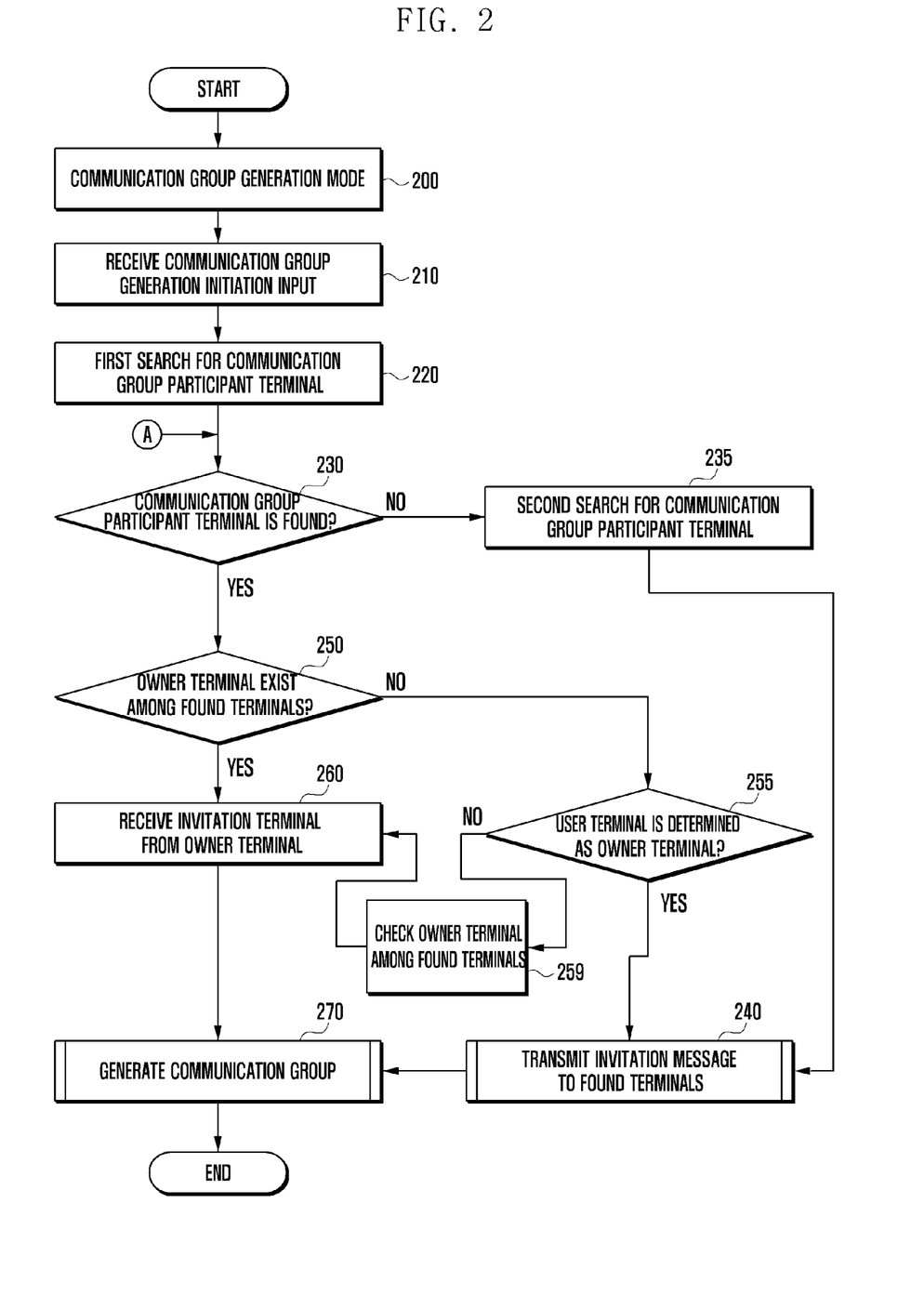
FIG. 2 is a flowchart illustrating a communication group generation method, according to an embodiment of the present invention.

FIG. 2 is a flowchart illustrating the communication group generation method, according to an embodiment of the present invention.

Referring to FIG. 2, the terminal 100 operates in the communication group generation mode, in step 200. Specifically, the control unit 150 receives input for activating the communication group generation mode from the display unit 150 or the key input unit 120.

The terminal 100 receives the input for initiating communication group generation, in step 210. If a certain communication group is supposed to be generated among a plurality of terminal users, the communication group generation procedure is initiated in the communication group generation mode, in step 200 and, in this case, step 210 may be omitted.

The communication group generation initiation input of step 210 may be the input of an ID predetermined among the terminals joining the communication group generation. Specifically, if a specific ID is input to the terminal 100 in the communication group generation mode, and the same ID is input to the communication group participant terminal, these terminals generate a specific communication group identified by the common ID.

Although an ID may be shared in the same format among all the terminals participating in communication group generation, embodiments of the present invention are not limited thereto. Specifically, the ID may be generated in the form of a combination of a common ID and a terminal-specific ID.

Three terminals may generate a communication group, the password required to connect to the communication group may be a common ID of XYZ, and the unique IDs of the terminals may be 1, 2, and 3, respectively. The three terminals may receive the input of XYZ1, XYZ2, and XYZ2, respectively.

Such terminal IDs may be used as the priority determination criteria.

The terminal 100 and the communication group participant terminals may share their unique information through the search process. For example, the numbers 1, 2, and 3 of XYZ1, XYZ2, and XYZ3 input to the three respective terminals correspond to the unique information of the terminals. Accordingly, if the predetermined determination criteria are the numbers of the unique IDs of the terminals, the terminal that received the input of XYZ1 may be determined to be the communication group owner terminal, and the terminals that received the inputs of XYZ2 and XYZ3 may receive the communication group invitation message from the terminal that received the input of XYZ1 in the sequential order. Although the description is directed to the case where the ID consists of three characters and one number, embodiments of the present invention are not limited thereto, and may be embodied with various changes according to the user's configuration and manufacturer's configuration, and in consideration of the compatibility with the conventional system.

The ID may be input through one of the key input unit 120 and display unit 140 when the user interface associated with the communication group generation mode of the terminal is displayed to permit connection to a specific communication group.

The input for initiating communication group generation is not limited to the above-described ID input. The input for initiating communication group generation may be made with a key designated for a communication group generation initiation command, which is provided by the key input unit 120 or the display unit 140. For example, the communication group generation initiation command may be input by means of a shortcut key designated by the user or manufacturer. The terminal may perform the procedure subsequent to step 220 upon receipt of the communication group generation initiation key input.

The terminal 100 searches for communication group participant terminals by means of the communication unit 110, in step 220. The search process may follow the SCAN process specified in the IEEE 802.11 standard and, more particularly, Wi-Fi Direct Discovery standard. The search process may be performed according to other compatible device discovery methods, and the search period and number of scans may be modified according to the user's intention and usage environment.

The terminal 100 may receive a response from the communication group participant terminal through a communication group participant terminal search operation.

In order to improve the efficiency of the search process, the terminal 100 may receive the response from the terminal operating in the communication group generation mode. The terminal 100 may perform the search process in response to the communication group generation initiation command input at step 210. For example, if an ID is input at step 210, the response may be received from the terminal, which has received the input of XYZ. When the shortcut key input is received, it is possible to receive the response from the terminal, which has received the same key input.

Such a response may include unique information of the communication group participant terminal. For example, the terminal 100 may determine whether the common ID or predetermined shortcut key input is received based on the unique information included in the response.

In step 230, it is determined whether communication group participant terminals corresponding to the communication group generation initiation command input to the terminal 100 are found. If a communication group participant terminal is found, the terminal 100 determines whether there is an owner terminal among the found communication group participant terminals, in step 250.

If it is determined that there is an owner terminal among the found communication group participant terminals, one of the following situations has taken place.

First, the owner terminal is determined according to the priority determination criteria among the communication group participant terminals. This is the case when the communication group participant terminals perform the communication group generation procedure to determine the owner terminal prior to the terminal 100.

Second, the terminal that has failed to find the communication group owner terminal among the communication group participant terminals in the first search process becomes the communication group owner terminal.

Third, the owner terminal is determined among the communication group participant terminals, with the exception of the terminal 100, through a priority determination procedure, according to the predetermined priority determination criteria. The terminal 100 may check determine the communication group owner terminal from the unique information of the communication group participant terminals that are acquired in the search and response process.

If the communication group owner terminal (which is not the terminal 100) is determined, the terminal 100 checks the communication group owner terminal, in step 259, and receives the communication group invitation message from the communication group owner terminal, in step 260.

If the invitation message is received from the communication group owner terminal, the terminal 100 automatically connects to the communication group owner terminal to complete the generation of communication group, in step 270. According to compatibility with previous systems, user's intention, or manufacturer's intention, the terminal may perform an additional process of transmitting a connection request message and receiving an accept message FIG. 3 is a flowchart illustrating terminal operation after the generation of the communication group, according to an embodiment of the present invention.

Figure 3:
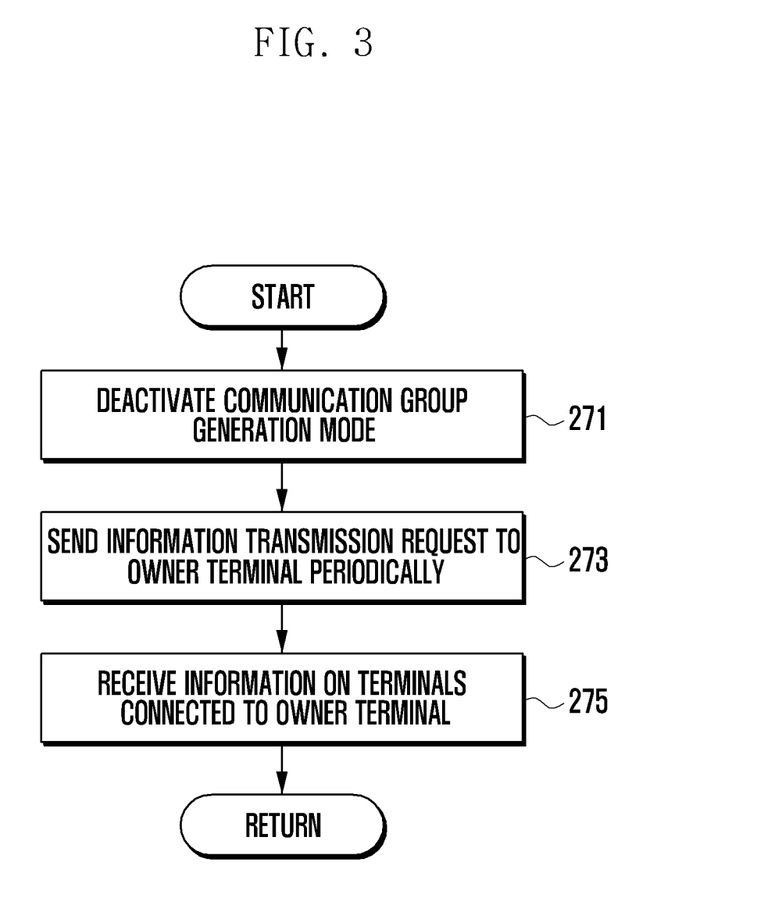
FIG. 3 is a flowchart illustrating terminal operation after the generation of the communication group, according to an embodiment of the present invention.

Referring to FIGS. 2 and 3, if the communication group has been generated successfully, in operation 270, the control unit 150 of the terminal 100 deactivates the communication group generation mode, in step 271. The terminal 100 periodically transfers terminal information to the communication group owner terminal and requests the communication group owner terminal to transmit information on terminals included in the communication group, in step 273. The information transmission request may request transmission of a list including information on the terminals belonging to the communication group. The terminal 100 receives the information on the terminals belonging to the communication group from the communication group owner terminal, in step 275.

Referring back to FIG. 2, if the terminal 100 fails to finding any communication group participant terminal in step 230, the terminal 100 becomes the communication group owner terminal and performs a second search process, in step 235. This may occur when the terminal 100 enters the communication group generation mode first. If any communication group participant terminal is found as a result of the second search process, the terminal 100 transmits the communication group invitation message to the found communication group participant terminal, in step 240. Accordingly, the communication group participant terminal connects to the terminal 100 to generate the communication group, in step 270.

Figure 4:
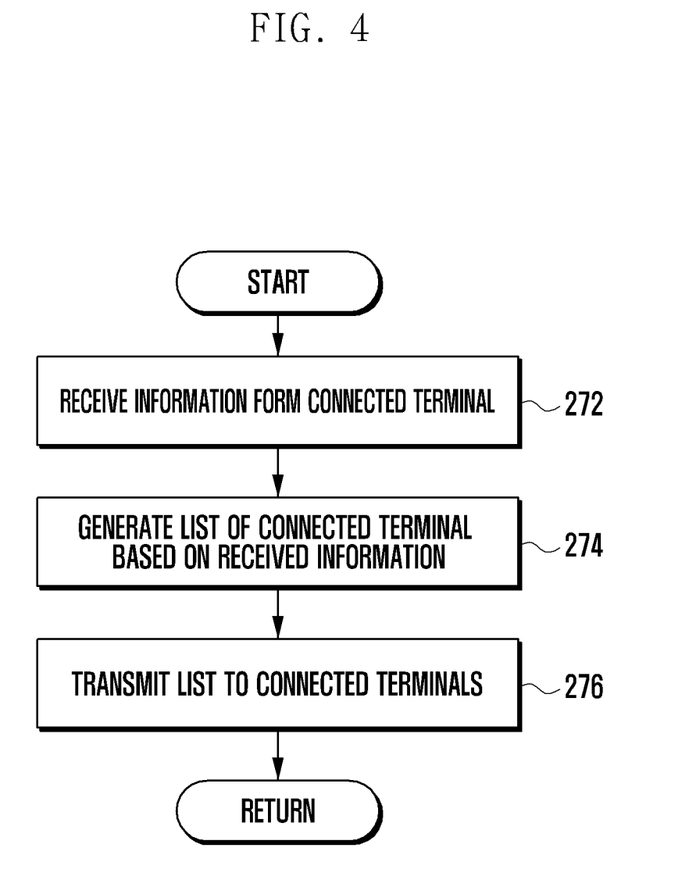
FIG. 4 is a flowchart illustrating terminal operation after the generation of the communication group, according to an embodiment of the present invention.

FIG. 4 is a flowchart illustrating the terminal operation after the generation of the communication group, according to an embodiment of the present invention.

Referring to FIGS. 2 and 4, the terminal 100 receives terminal information on the communication group participant terminals, in step 272. The terminal information may be received periodically. The control unit 150 of the terminal 100 generates a list of the terminals belonging to the communication group, including the information received from the communication group participant terminals, in step 274. Such a list may be updated according to the received information update and may change in the connection state. The terminal transmits the list to the communication group participant terminals, in step 276. The list may be transmitted periodically or whenever the list is updated.

Figure 5:
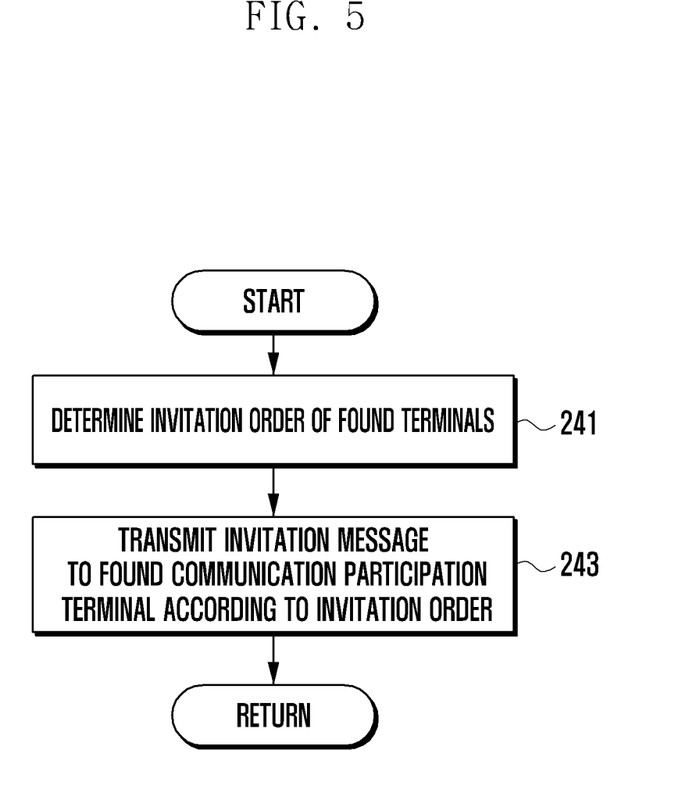
FIG. 5 is a flowchart illustrating a communication group generation procedure of the communication group owner terminal, according to an embodiment of the present invention.

FIG. 5 is a flowchart illustrating a communication group generation procedure of the communication group owner terminal, according to an embodiment of the present invention.

Referring to FIGS. 2 and 5, if there is not owner terminal among the found terminals, in step 250, the terminal 100 determines which terminal has the highest priority among itself and the communication group participant terminals, according to predetermined priority determination criteria. The terminal 100 determines if it has the highest priority, as the communication group owner terminal, in step 255. If it is determined that the terminal 100 is the communication group owner terminal in step 255, the terminal 100 transmits an invitation message to found terminals, in step 240, which is described in greater detail with respect to FIG. 5.

The terminal 100, as the communication group owner terminal, may determine the communication group invitation message transmission order of the communication group participant terminals, according to predetermined priority determination criteria, in step 241. The terminal 100 sequentially transmits the communication group invitation message to the communication group participant terminals, according to the determined invitation message transmission order, to generate the communication group, in step 243.

Referring back to FIG. 2, if it is determined that the terminal 100 does not have the highest priority in step 255, the terminal 100 selects one of the found communication group participant terminals as the communication group owner terminal, in step 259. The terminal 100 performs the procedure of steps 260 and 270, as described above.

Figure 6:
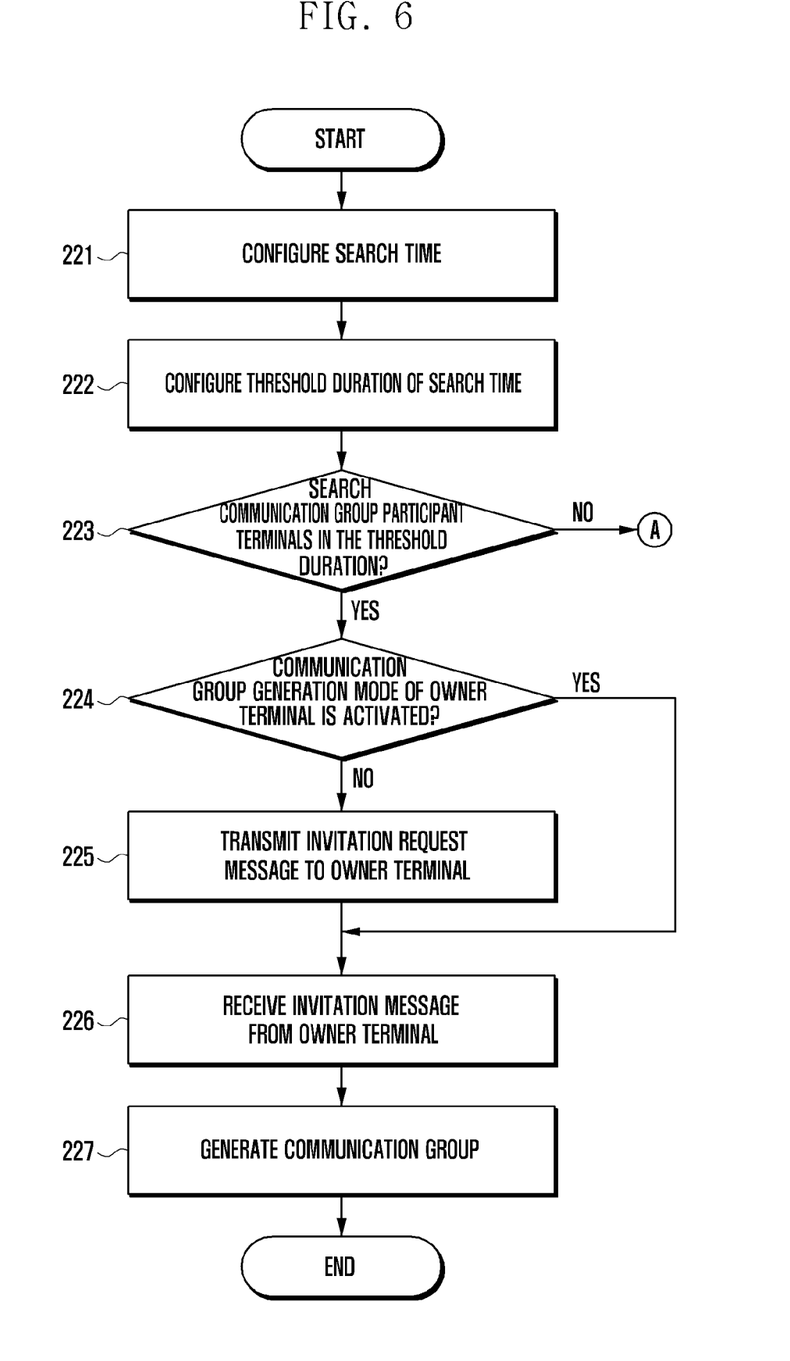
FIG. 6 is a flowchart illustrating a terminal procedure of connecting to the communication group owner terminal in a search time duration of a predetermined period in the communication group generation method, according to an embodiment of the present invention.

FIG. 6 is a flowchart illustrating a terminal procedure for connecting to the communication group owner terminal in a search time duration of a predetermined period in the communication group generation method, according to an embodiment of the present invention.

Referring to FIGS. 2 and 6, the terminal 100 may restrict the search time or number of searches in order to reduce power consumption in the search process of step 220. The search time may be set to a value other than 0, and the number of searches may be set to 1 in consideration of user's or designer's intention and/or compatibility with pervious systems. The terminal 100 may perform the search process in step 220 according to the predetermined time duration and number of times.

For example, the terminal 100 may perform the search process three times for 60 seconds each, or for 60 seconds for the first time, 30 seconds for the second time, and 10 seconds for the third time. The terminal 100 configures a search time period, in step 221, and configures a threshold duration in the search time period, in step 222, according to the user's or designer's settings. These processes may be performed simultaneously according to the user interface supported by the terminal 100. The threshold duration may be set to the last 10 seconds of a 60-second search period. In step 223, the terminal determines whether any communication group participant terminal is found in the predetermined threshold duration. If no communication group participant terminal is found in the threshold duration, e.g. any communication group participant terminal is found in the first 50 seconds of the 60-second search period, the procedure branches out to A to proceed to step 230 of FIG. 2.

If any communication group participant terminal is found in the predetermined threshold duration, e.g., the terminal 100 discovers any communication group participant terminal in the last ten seconds of the 60-second search period, the terminal 100 may not have been found in the search processes of the communication group participant terminals or may have failed to reply to a message from the owner terminal selected among the communication group participant terminals. This also may be the case where the communication group generation has completed almost among the communication group participant terminals. If the communication group generation has completed, the communication group generation mode of the owner terminal may be deactivated.

The terminal 100 determines whether the communication group generation mode of the owner terminal is activated, in step 224. If the communication group generation mode is deactivated, the terminal 100 transmits a communication group invitation request message to the owner terminal, in step 225. If the terminal 100 has transmitted the invitation request message to the communication group owner terminal in step 225, or if the communication group generation mode of the owner terminal has been activated, the terminal 100 receives the communication group invitation message from the owner terminal, in step 226. The terminal 100 connects to the owner terminal to complete the communication group generation, in step 227. If the communication group generation has completed, the terminal may further perform the procedure of FIG. 3.

Figure 7:
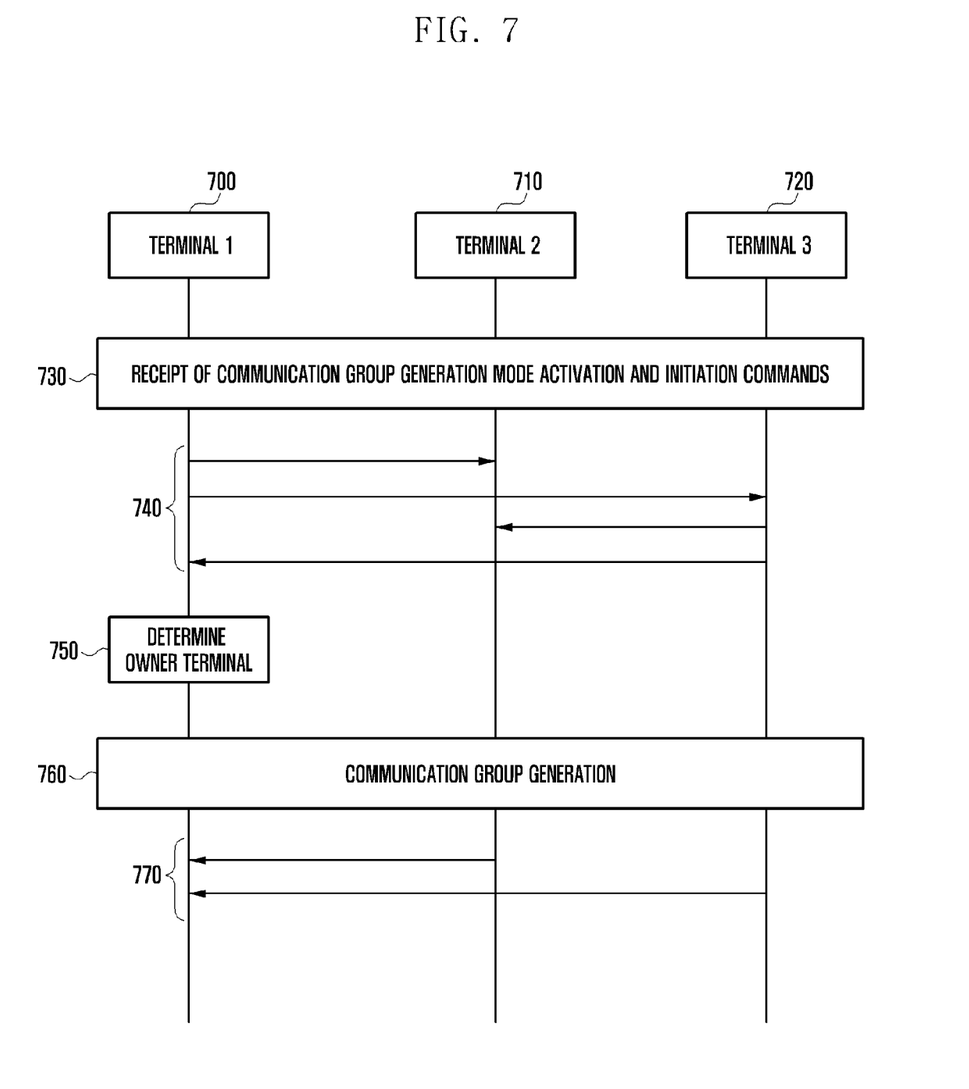
FIG. 7 is a signal flow diagram illustrating a procedure of generating a communication group among a plurality of terminals, according to an embodiment of the present invention.

FIG. 7 is a signal flow diagram illustrating a procedure of generating a communication group among a plurality of terminals, according to an embodiment of the present invention.

It is assumed that three terminals, i.e., terminal 1 700, terminal 2 710, and terminal 3 730, generate a communication group.

The terminals 700, 710, and 720 respectively receive the communication group generation mode entry (activation) command, and a communication group generation initiation command, in step 730. The mode activation and initiation commands may be input in response to separate operations or a single operation. This corresponds to steps 200 and 210 of FIG. 2.

If the owner terminal has already been determined, the terminals 700, 710, and 720 perform the search and response procedure upon receipt of the communication group generation initiation command, in step 740. This corresponds to step 220 of FIG. 2.

When there is an owner terminal prior to the search and response step 740, the non-owner terminals respond to only the owner terminal. However, in this embodiment of the present invention, it is assumed that the owner terminal is determined through the search and response process.

Through the search and response process, the terminals 700, 710, and 720 share their unique information and determine the owner terminal based on the predetermined priority determination criteria, in 750. Here, it is assumed that the terminal 1 700 is determined as the owner terminal. When the owner terminal is determined, the terminals 700, 710, and 720 perform steps 250, 255, and 235 and subsequent operations of FIG. 2.

If the terminal 1 700 is determined as the owner terminal, in step 750, the terminal 2 710 and terminal 3 720 connect to the terminal 1 700 to generate a communication group, in step 760 and, in this process, the terminals 700, 710, and 720 exchange invitation messages. The terminal 1 700 receives terminal information from the terminal 2 710 and the terminal 3 720, in step 770.

The terminal 1 700 generates a communication group list based on the terminal information and transmits the list to the terminal 2 710 and terminal 3 720 included in the communication group. If any change occurs in the communication group (e.g., if the terminal 3 720 disjoins the communication group, if the connection is broken, or if another terminal joins the communication group), the terminal 1 700 detects this based on the periodic receipt of information. The terminal 1 700 may update the information on the terminals belonging to the communication group and the communication group list, and may transmit the updated list to the terminals within the communication group.

As described above, the communication group generation method and apparatus of a terminal is capable of allowing a terminal to receive an input for generating a communication group including a plurality of terminals and establish connections with the plurality of terminals without collisions among the terminals regardless of the number of terminals simultaneously attempting connection. The communication group generation method and apparatus of a terminal is capable of reducing the latency caused by a stepwise connection process, thereby speeding up a communication group generation process among the plurality of terminals.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for generating a communication group in a terminal, the method comprising the steps of:
   receiving, at a control unit of the terminal, an input for initiating generation of the communication group while the terminal operates in a communication group generation mode;
   searching, by a radio communication unit of the terminal, for one or more communication group participant terminals in response to the input;
   when at least one communication group participant terminal is found by the radio communication unit, determining, by the control unit, whether an owner terminal of the communication group exists among the at least one communication group participant terminal based on predetermined priority determination criteria;
   when the owner terminal of the communication group exists, receiving, by the control unit, an invitation message from the owner terminal, and connecting, by the control unit, to the owner terminal upon reception of the invitation message; and
   when the owner terminal of the communication group does not exist, determining, by the control unit, the terminal as the owner terminal of the communication group when the terminal has a higher priority than the at least one communication group participant terminal.

2. The method of claim 1, wherein receiving the input comprises receiving the input of a predetermined identifier (ID) for use in generating the communication group.

3. The method of claim 2, wherein searching for the one or more communication group participant terminals comprises determining whether a response is received from the at least one terminal having an ID that matches the predetermined ID.

4. The method of claim 1, wherein searching for the one or more communication group participant terminals comprises determining whether a response is received from the at least one communication group participant terminal in the communication group generation mode.

5. The method of claim 4, wherein searching for the one or more communication group participant terminals comprises:
   when no communication group participant terminal is found, performing a second search for the one or more communication group participant terminals in response to the input;
   when the at least one communication group participant terminal is found in the second search, transmitting the invitation message to the at least one communication group participant terminal; and
   generating the communication group upon receipt of a connection message from the at least one communication group participant terminal.

6. The method of claim 1, wherein connecting to the owner terminal comprises:
   deactivating the communication group generation mode; and
   receiving terminal information on all terminals connected to the owner terminal of the communication group, from the owner terminal at a predetermined period.

7. The method of claim 1, further comprising:
   transmitting the invitation message to the at least one communication group participant terminal, when the owner terminal of the communication group does not exist and the terminal has a higher priority than the at least one communication group participant terminal.

8. The method of claim 7, wherein transmitting the invitation message comprises:

determining an invitation order of the at least one communication group participant terminal according to the predetermined priority determination criteria; and
transmitting the invitation message to the at least one communication group participant terminal according to the invitation order.

9. The method of claim 7, wherein transmitting the invitation message comprises:
detecting connection of the at least one communication group participant terminal;
receiving information from the detected at least one communication group participant terminal;
generating a list of terminals included in the communication group, wherein the list comprises information on the terminal and the detected at least one communication group participant terminal; and
transmitting the list to the detected at least one communication group participant terminal.

10. The method of claim 9, wherein receiving the information comprises updating the information on the detected at least one communication group participant terminal at a predetermined period.

11. The method of claim 1, further comprising:
when the owner terminal of the communication group does not exist and the terminal has a lower priority that the at least one communication group participant terminal:
determining one of the at least one communication group participant terminal as the owner terminal of the communication group; and
when the invitation message is received at the terminal, connecting to the owner terminal of the communication group.

12. The method of claim 1, wherein searching for the one or more communication group participant terminals comprises searching for the one or more communication group participant terminals for a predetermined time as many as predetermined number of times.

13. The method of claim 12, further comprising:
when the at least one communication group participant terminal is found in a predetermined threshold duration within the predetermined time, determining whether the owner terminal is in the communication group generation mode; and
when the owner terminal is not in the communication group generation mode, transmitting a communication group invitation request message to the owner terminal.

14. A terminal supporting a communication group generation mode, the terminal comprising:
a display unit that includes a touch panel;
a radio communication unit that is responsible for communication with one or more communication group participant terminals; and
a control unit that controls the display unit to display an interface for generating a communication group, receives an input for initiating generation of the communication group through the display unit, controls the radio communication unit to search for the one or more communication group participant terminals in response to the input, determines, when at least one communication group participant terminal is found, whether an owner terminal of the communication group exists among the at least one communication group participant terminal based on predetermined priority determination criteria, when the owner terminal of the communication group exists, receives an invitation message from the owner terminal and controls connecting the terminal to the owner terminal upon reception of the invitation message, and, when the owner terminal of the communication group does not exist, determine the terminal as the owner terminal of the communication group when the terminal has a higher priority than the at least one communication group participant terminal.

15. The terminal of claim 14, wherein, when the owner terminal of the communication group does not exist and the terminal has a higher priority than the at least one communication group participant terminal, the control unit controls transmitting the invitation message to the communication group participant terminal, receiving a connection message from the at least one communication group participant terminal by means of the radio communication unit, and generating the communication group.

16. The terminal of claim 15, wherein the control unit controls the radio communication unit to receive, when the communication group is generated, information from the at least one communication group participant terminal connected to the terminal, generates a list of terminals included in the communication group, wherein the list comprises information on the terminal and the detected at least one communication group participant terminal, and controls the radio communication unit to transmit the list to the detected at least one communication group participant terminal.

17. The terminal of claim 14, wherein when the owner terminal of the communication terminal of the communication group does not exist and the terminal has a lower priority than the at least one communication group participant terminal, the control unit controls determining one of the at least one communication group participant terminal as the owner terminal of the communication group, and controls connecting to the owner terminal of the communication group when an invitation message is received.

18. The terminal of claim 14, wherein the control unit controls deactivating the communication group generation mode and receiving, by means of the radio communication unit, terminal information on all terminals connected to the owner terminal of the communication group from the owner terminal at a predetermined period.

19. The terminal of claim 14, wherein, when no communication group participant terminal is found, the control unit determines the terminal as the owner terminal of the communication group and controls performing a second search for the one or more communication group participant terminals in response to the input, transmitting, when the at least one communication group participant terminal is found in the second search, the invitation message to the found at least one communication group participant terminal, and generating the communication group upon receipt of a connection message from the at least one communication group participant terminal.

* * * * *